United States Patent [19]

Chevereau et al.

[11] Patent Number: 5,282,232
[45] Date of Patent: Jan. 25, 1994

[54] NUCLEAR REACTOR UPPER INTERNAL EQUIPMENT WITH CLUSTER GUIDE DEVICES

[75] Inventors: Gérard Chevereau, Le Raincy; Guy Desfontaines, Puteaux; Bernard Dumortier, Toulouse, all of France

[73] Assignee: Framatome, Courbevoue, France

[21] Appl. No.: 311,489

[22] Filed: Feb. 15, 1989

[30] Foreign Application Priority Data

Feb. 15, 1988 [FR] France ................. 88 01755

[51] Int. Cl.$^5$ .................. G21C 19/00; G21C 1/01
[52] U.S. Cl. ................... 376/353; 376/292; 376/463
[58] Field of Search ............. 376/353, 327, 362, 363, 376/463, 292, 352

[56] References Cited

U.S. PATENT DOCUMENTS

| | | | |
|---|---|---|---|
| 3,090,743 | 5/1963 | Alfille | 376/352 |
| 3,138,534 | 6/1964 | Frisch et al. | 376/352 |
| 3,930,938 | 1/1976 | Berglund et al. | |
| 3,940,311 | 2/1976 | Frisch et al. | 376/353 |
| 4,092,216 | 5/1978 | Aubert | 376/353 |
| 4,173,513 | 11/1979 | Obermeyer et al. | |
| 4,284,475 | 8/1981 | Anthony | |
| 4,534,933 | 8/1985 | Gjertsen et al. | 376/353 |
| 4,617,171 | 10/1986 | Feutrel | 376/446 |
| 4,631,168 | 12/1968 | Shallenberger et al. | 376/353 |
| 4,746,488 | 5/1988 | Pradal et al. | 376/352 |
| 4,752,438 | 6/1988 | Desfontaines et al. | 376/353 |

FOREIGN PATENT DOCUMENTS

| | | | |
|---|---|---|---|
| 1506453 | 12/1967 | France | 376/362 |
| 0007399 | 1/1976 | Japan | 376/353 |
| 1228610 | 4/1971 | United Kingdom | 376/353 |

Primary Examiner—Behrend E. Harvey
Attorney, Agent, or Firm—Pollock, Vande Sande & Priddy

[57] ABSTRACT

Upper internals for a nuclear reactor comprise an upper core plate and a plate which supports cluster guides tubes connecting the two plates together. The cluster guides project above the support plate. A bottom wall of the support plate is situated at a level just higher than the outlet nozzles of the reactor vessel and each guide is supported by the bottom wall of the support plate by abutment of a shoulder formed in a passage of the bottom wall, in the lower half thereof.

9 Claims, 2 Drawing Sheets

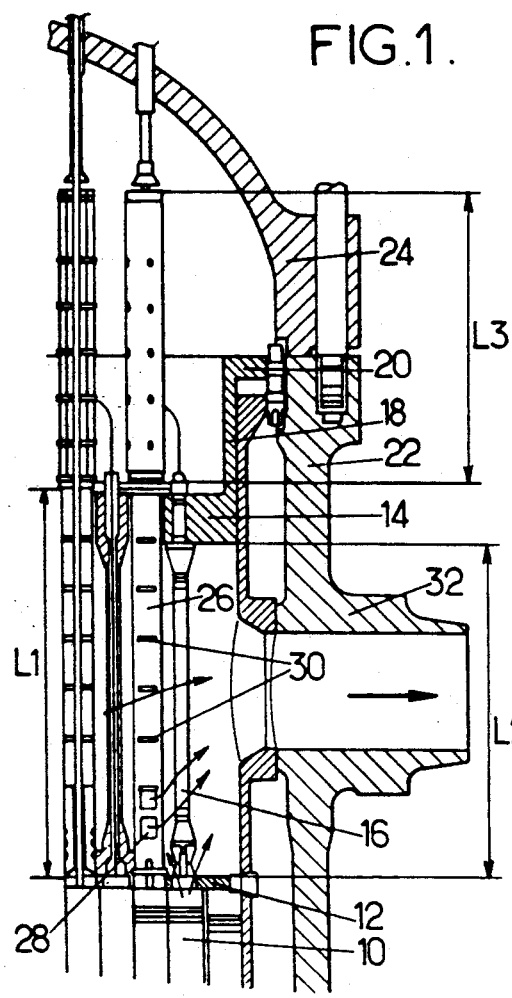
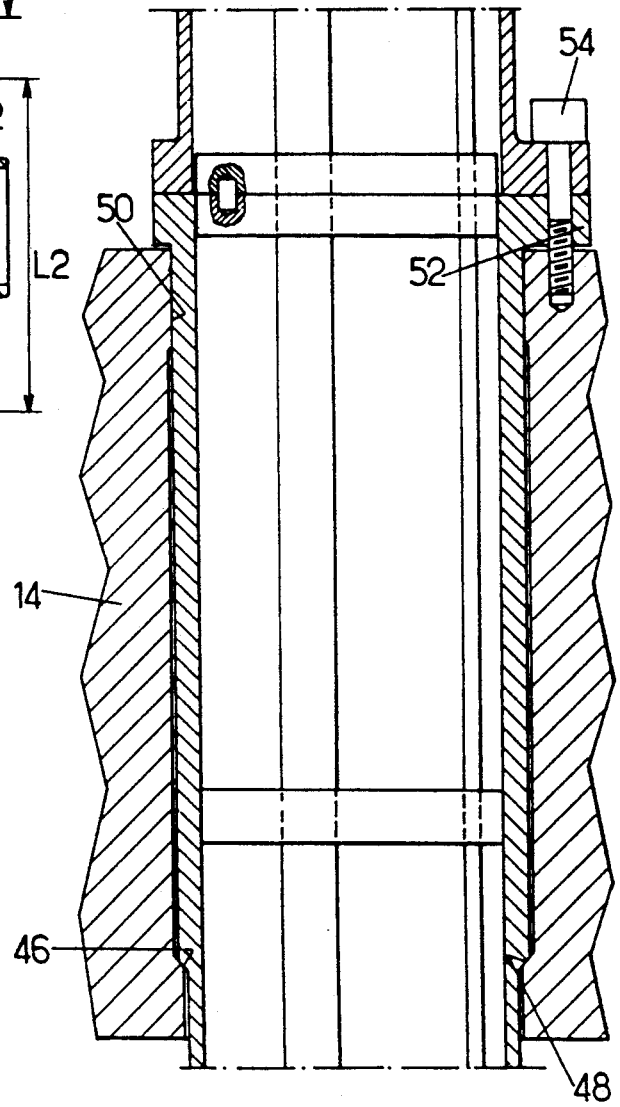

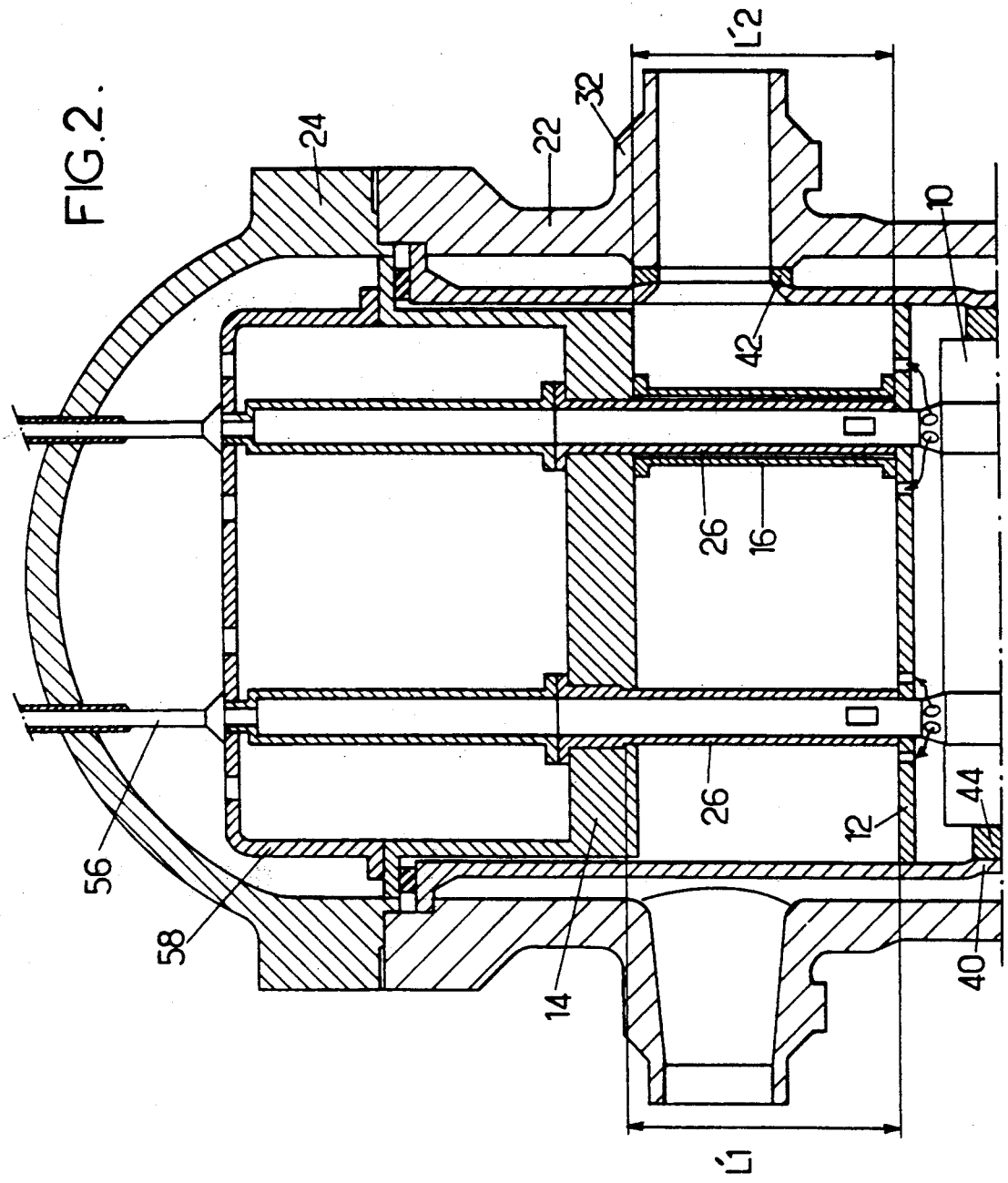

NUCLEAR REACTOR UPPER INTERNAL EQUIPMENT WITH CLUSTER GUIDE DEVICES

BACKGROUND OF THE INVENTION

1. Technical Field

The invention relates to upper internal equipments of water-cooled and moderate nuclear reactors of the type having a vessel provided with lateral water outlet nozzles and closed by a lid, said equipment having an upper core plate and a plate supporting the cluster guides which connect the two plates together and have a portion projecting above the support plate.

The invention is particularly, although not exclusively, suitable for use in so-called "advanced" pressurized water nuclear reactors, of the under-moderated and/or spectral shift type, whose fuel assemblies are often distributed in the core with closer spacing than in the thermal neutron reactors at present in service. The reduction in spacing results in a closer arrangement of the cluster guides which reduces the flow cross-sectional area offered to the coolant leaving the core upwardly and whose flow lines are curved towards the nozzles through the lattice of cluster guides.

The flow cross-section left free is even smaller in reactors with spectral shift, which comprise not only guides for the absorbent control clusters but also guides for the spectrum variation clusters which modify the volume of water in the core and possibly (in the case of fuel rod clusters containing fertile material) further harden the spectrum by selective absorption of slow neutrons.

2. Prior Art

In present day thermal pressurized water reactors, such as those described in European Patent No. 079,828 (Framatome) and French Patent No. 2,399,715 (Westinghouse), the pressurized water leaving the core is directed to the outlet nozzles through the upper internal equipment between the cluster guides and, if provided, spacers which connect the plates together. In the prior art arrangement shown by way of example in FIG. 1, core 10 has the upper internal equipment mounted thereover. This equipment includes an upper core plate 12 which is rigidly fixed to a plate 14, supporting guides 26, by evenly distributed spacers 16. The support plate 14 is a solid part having a bottom wall to which the spacers 16 are fixed, connected by a sleeve 18 to a flange 20 supported by the vessel 22 of the reactor, closed by a cover 24.

The cluster guides 26 are disposed at locations between the spacers, in alignment with those of the fuel assemblies which are to receive clusters. As shown in FIG. 1, the cluster guides 26 are in two parts. The lower part, placed in the internal equipment, is provided with a connection flange bearing on the upper surface of the bottom wall of the support plate 14. The lower end portion of the lower part is engaged in a guide hole formed in the upper core plate 12. The upper part of each cluster guide is fixed by flanges and bolts to the respective lower part.

As shown, water leaves the core through openings formed in the upper core plate 12 between the cluster guides and/or at the foot of spacers 16 and through windows 28 formed in the lower zone of the cluster guides. The cluster guides each carry vertically distributed horizontal guide plates 30 having a cut out corresponding to the distribution of the rods of the cluster.

The bottom wall of the support plate 14 is at a level appreciably higher than that of the outlet nozzles 32. The lengths between bearing points, L1 for the cluster guides and L2 for the spacers, are important and impart to the respective members a flexibility which, if the cross-sectional flow area left for the coolant is appreciably less than that found in present day reactors and if therefore the flow speed is increased, may result in unacceptable vibrations.

SUMMARY OF THE INVENTION

It is an object of the invention to provide improved nuclear reactor internal equipment. It is a more specific object to provide internal equipment reducing instability and vibration.

To this end, there is provided internal equipment of the above-defined kind wherein the bottom wall of the support plate is at a horizontal level immediately above that of the outlet nozzles. Each cluster guide has an abutting connection with the bottom wall through a shoulder formed in a passage through the bottom wall and located in the lower half of the thickness of the bottom wall. The upper end of the projecting portion of the cluster guide may preferably be centered by a radial spacer plate. The spacer plate then has a flange supported by the vessel, an end wall situated at a level higher than the level of the flange and a ring portion connecting the horizontal end wall and the flange of the spacer plate together.

The rigidity of the cluster guides is increased since their top bearing point is at a low level and since they are engaged into, guided by and secured to the support plate. With the latter arrangement mentioned above, the radial spacer plate may in addition provide sealing between a guide sleeve for the drive Shaft of the cluster (the sleeve being fixed to the cover of the vessel) and the cluster guide and limit the flow through the dome, i.e., the volume under the cover.

BRIEF DESCRIPTION OF THE DRAWINGS

The invention will be better understood from the following description of a particular embodiment, given by way of example only. The description refers to the accompanying drawings, in which FIG. 1, already mentioned, shows part of the upper internal equipment of a pressurized water nuclear reactor of the prior art;

FIG. 2, similar to FIG. 1, shows schematically the upper part of a nuclear reactor according to an embodiment of the invention; and FIG. 3 is an enlarged detail view showing a possible connection of a guide to the support plate shown in FIG. 2.

DETAILED DESCRIPTION OF A PREFERRED EMBODIMENT

Referring to FIG. 2, a nuclear reactor has a general construction similar to that of FIG. 1 and to that of PWRs now in operation. It again includes a pressure vessel 22 closed by a cover 24. The core 10 is formed of juxtaposed fuel assemblies, whose individual cross-section may be hexagonal or square. For greater simplicity, only two assemblies of the core have been schematically shown. The core is carried by a lower core plate (not shown) supported by a barrel 40 having an upper flange resting on the vessel and having adapters 42 for connection to nozzles 32. The annular space between skirt 40 and the periphery of the core accommodates a metal filling 44 forming a neutron reflector.

As in FIG. 1, the upper internal equipment includes a support plate 14, supporting cluster guides 26. The support plate 14 is connected to the upper core plate 12 by tubular spacers 16 one of which is illustrated; as shown, the spacers are situated about certain of the cluster guides 26.

In the embodiment of the invention shown in FIG. 2, the support plate 14 includes a cylindrical ring whose length is appreciably greater than that of the ring of a conventional support plate so that the lower surface of the bottom wall thereof is just above the level of the nozzles 32. As shown in FIG. 3, each guide 26 is formed with an external downwardly facing shoulder 46 bearing on a corresponding upwardly facing shoulder 48 formed as low as possible in a passage through plate 14. Each guide consequently rests on the bottom wall of the support plate 14. Shoulders 46 and 48 are advantageously slanted, for example at an angle of 45°, with respect to the horizontal. The top part of the passage forms a bore 50 i which the cluster guide has a sliding fit while there is a radial clearance between shoulder 48 and bore 50. Consequently, the connection between the guide and the support plate retains the guide in proper vertical alignment through the plate. In practice, shoulder 48 will be placed in the lower half of the bottom wall and often substantially at a distance from the lower surface of the plate equal to about one tenth of the thickness of the bottom wall. Bore 50 will often be given a length approximately equal to one-tenth of the bottom wall thickness.

With these modifications of the conventional arrangement, the lengths L1 and L2 (FIG. 1) are reduced to values L′1 and L′2. By way of example, in a 1300 MWe reactor, the lengths L1 and L2 are at the present time about 2430 and 2125 mm, respectively. They may be reduced respectively to 2150 and 1750 mm by implementing the invention.

Each cluster guide 26 is typically formed of two parts. The lower part has a top flange 52 (FIG. 3) arranged to be connected, for example by bolts 54 distributed about the flange axis, to the support plate 14. The same bolts 54 secure a lower flange of the upper part of the cluster guide to flange 52. Studs for relative centering of the two flanges may be provided.

While lowering of the level of the bottom wall of the support plate 14 has a favorable effect on the lengths between bearing points of the guides and the spacers, it increases the length of the upper parts of guides 26. The cantiveler length, equal to L3 in FIG. 3, would be increased if no action were taken and this increase in length could in some cases cause mutual misalignment of the upper outlet of the cluster guide and the axis of the corresponding sleeve 56 connected to cover 24 through which the shaft driving the associated cluster projects.

In the embodiment of the invention shown in FIG. 2, possible misalignment is avoided by providing a radial spacer plate 58. This plate is hat shaped. It has a flange or rim secured to the flange of the support plate 14 by conventional means (not shown), a cylindrical ring and an upper end wall placed at a level higher than that of the flanges. The upper end wall is formed with openings each receiving the upper end part of a guide and centering it. The upper end part may be of reduced diameter and may have a sliding fit in the respective opening. The end wall of plate 58 may be at a level such that flared end portions of sleeves 56 are applied thereon and provide some degree of sealing limiting the water flow which passes through the dome, i.e., the volume immediately below the cover.

Wide openings are formed through the end wall or through the cylindrical ring of spacer plate 58 for allowing cooling water to flow through the volume defined by plates 14 and 58.

Numerous modifications of the invention are possible. For instance, only some of the cluster guides may have shoulders bearing on the bottom wall of the support plate 14 while other guides (those subjected to lower stresses by the water flow) are conventionally fixed by flanges. The latter arrangement may in particular apply to those of guides 26 which are surrounded by a spacer 16 protecting them to a large extent against the action of the circulating water. While, as indicated above, the invention is of particular interest in the PWRs having spectrum variation clusters in addition to control clusters exhibiting parasitic absorption of neutrons only, it is not limited to such reactors.

We claim:

1. In a water cooled and moderated nuclear reactor having a vessel provided with lateral water inlet nozzles and outlet nozzles and closed by a cover, a core in said vessel, upper internal equipment positioned above the core, said upper internal equipment having:

an upper core plate located over said core and spanning the whole core, a support plate located above the upper core plate and at a predetermined vertical distance thereof, and vertical cluster guides connecting the upper core plate and the support plate together and projecting upwardly above the support plate, each of said cluster guides having a radial flange secured to an upper surface of said support plate by disconnectable means, said support plate having a bottom wall situated at a horizontal level above the outlet nozzles, each of some at least of said cluster guides having a downwardly facing shoulder maintained by said disconnectable means in abutment against an upwardly facing shoulder formed in a respective passage through said bottom wall and located in a lower half portion of said bottom wall.

2. Internal equipment according to claim 1, further comprising a radial spacer plate having a support flange supported by said vessel, an end wall situated at a level higher than that of the support flange and a ring portion connecting the end wall and the support flange of said radial spacer plate together, said end wall having centering openings slidably receiving upper ends of the cluster guides which project upwardly from said support plate, whereby said upper ends are radially maintained in proper spacing.

3. Internal equipment according to claim 2, wherein the end wall of the radial spacer plate is placed at such a level as to form a flow restricting support for sleeves accommodating drive shafts controlling the clusters.

4. Internal equipment according to claim 1, wherein said upwardly facing shoulder is at a distance from a lower surface of the bottom wall of the support plate approximately equal to one-tenth of the thickness of the bottom wall.

5. In a water cooled and moderated nuclear reactor having a vessel provided with lateral water inlet nozzles and outlet nozzles and closed by a cover, a core in said vessel, upper internal equipment positioned above said core, said upper internal equipment having an upper core plate located over said core and spanning the entire core, a support plate located above the upper core plate and at a distance thereof, said support plate having a bottom wall situated at a horizontal level above the outlet nozzles and formed with a plurality of vertical passages, a plurality of cluster guides connecting the upper core plate and the support plate together and projecting upwardly above the support plate through respective one of said passages, each of some at least of said cluster guides having a downwardly facing shoulder bearing on an upwardly facing shoulder formed in the respective passage through said bottom wall and located in a lower half portion of said bottom wall, having a sliding fit with a bore formed in an upper portion of the respective passage and defining a radial clearance with that part of the passage which is between the bore and the upwardly facing shoulder.

6. Internal equipment according to claim 5, wherein each of said cluster guides consists of a lower part extending from said upper core plate to and through said support plate and an upper part in alignment with said lower part, said upper part having a lower radial flange secured to an upper radial flange of said lower part and to the upper surface of said support part by bolt means.

7. Internal equipment according to claim 6, further comprising a radial spacer plate having a support flange supported by said vessel, an end wall situated at a level higher than that of the support flange and a ring portion connecting the end wall and the support flange of said radial spacer plate together, said end wall having flow openings and having centering openings slidably receiving said upper parts of the cluster guides which project upwardly from said support plate.

8. Internal equipment according to claim 6, further comprising tubular spacers located around certain at least of said lower parts and coaxially thereto and connecting said upper core plate and said support plate.

9. Internal equipment according to claim 5, wherein said upwardly facing shoulder is slanted and is at a distance from a lower surface of the bottom wall of the support plate approximately equal to one-tenth of the thickness of the bottom wall and the length of said bore is approximately one-tenth of the thickness of the bottom wall.

* * * * *